(12) United States Patent
Simoens

(10) Patent No.: US 6,253,784 B1
(45) Date of Patent: Jul. 3, 2001

(54) MONOSTABLE VALVE

(76) Inventor: Hervé Simoens, 139-141 rue du Luxembourg, Roubaix 59100 (FR)

( * ) Notice: Subject to any disclaimer, the term of this patent is extended or adjusted under 35 U.S.C. 154(b) by 0 days.

(21) Appl. No.: 09/367,598
(22) PCT Filed: Dec. 17, 1998
(86) PCT No.: PCT/FR98/02756
§ 371 Date: Aug. 18, 1999
§ 102(e) Date: Aug. 18, 1999
(87) PCT Pub. No.: WO99/32818
PCT Pub. Date: Jan. 7, 1999

(30) Foreign Application Priority Data

Dec. 18, 1997 (FR) .................................................. 97 16424

(51) Int. Cl.$^7$ .................................................. F16K 31/46
(52) U.S. Cl. .......................... 137/240; 251/26; 251/30.01
(58) Field of Search .................................. 251/26, 30.01, 251/30.02, 63; 137/240

(56) References Cited

U.S. PATENT DOCUMENTS

| | | | |
|---|---|---|---|
| 3,346,004 | * 10/1967 | Costello | 251/26 X |
| 3,905,575 | 9/1975 | Zeuner et al. | |
| 4,099,701 | * 7/1978 | Berger | 251/30.05 |
| 4,135,696 | * 1/1979 | Saarem et al. | 251/30.02 |
| 4,197,873 | * 4/1980 | Minogue et al. | 137/240 X |
| 4,201,362 | 5/1980 | Nishimi et al. | |
| 4,226,259 | * 10/1980 | Szekely et al. | 251/30.02 X |
| 4,235,414 | * 11/1980 | Lis | 251/30.02 X |
| 4,462,420 | * 7/1984 | Cullie | 137/240 X |
| 4,503,887 | * 3/1985 | Johnson et al. | 251/30.01 X |
| 4,524,906 | * 6/1985 | Kenyon et al. | 251/30.01 X |
| 5,520,366 | * 5/1996 | Elliott | 251/30.01 |
| 5,967,167 | * 10/1999 | Johnson | 251/26 |

FOREIGN PATENT DOCUMENTS

WO93/01433  1/1993  (WO) .

* cited by examiner

Primary Examiner—Kevin Shaver
Assistant Examiner—John Bastianelli
(74) Attorney, Agent, or Firm—William L. Feeney; Edward J. Kondracki; Miles & Stockbridge P.C.

(57) ABSTRACT

A monostable valve for controlling the sudden discharge of a gas contained in an enclosure. This valve comprises, in a control conduit (17), a second shutoff (18) between a closed position wherein the gas contained in the control chamber (13) cannot escape and a discharge position wherein the gas contained in the control chamber can escape, a drive mechanism (19) for rapidly moving the control shutoff to its discharge position, and a mechanism (20) for returning the control shutter to its closed position, respectively, and in that the area defined by the cross section of the discharge conduit (11) is at least constant, even increasing from the rear chamber (9) toward the outlet conduit (6) in order to limit head loss, and the main shutter (12) has low inertia.

7 Claims, 4 Drawing Sheets

MONOSTABLE VALVE

The invention relates to a monostable valve for progressively charging, then controlling the sudden discharge of a gas contained in an enclosure.

To facilitate the flow of granular material and/or to prevent the formation of concretions, for example, in cement-producing kilns, devices known as air guns are used.

This device comprises an enclosure in which a volume of air is accumulated under pressure, then periodically released suddenly, for example through a nozzle, so that the blast produced removes the concretions.

In order to allow, first of all, the accumulation of the air in the enclosure, and secondly, this sudden discharge, a monostable valve disposed between the enclosure and the nozzle controls the passage of the air from a source inside the enclosure, and from the enclosure to the nozzle or another means.

Typically, this monostable valve comprises:

a body delimiting a chamber having an inlet conduit connected to the enclosure and a so-called discharge opening to an outlet conduit, a piston housed in the above-mentioned chamber that moves between a so-called closed position in which the front surface of this piston closes the discharge opening and a so-called open position in which this front surface is separated from the discharge opening so that the air in the enclosure can be discharged suddenly through the outlet conduit, which piston:

has a flange that divides the chamber into a front chamber and a rear chamber, whose so-called "front surface" facing the front of the piston and the discharge opening is subjected to the pressure of the air trapped in the enclosure, which pressure generates a so-called opening force that tends to push the piston back and bring it into the open position, and delimits, between its rear surface and the body of the valve, said rear chamber in which a pressure is exerted that generates on the back of the piston a so-called closing force, pushing the piston into its closed position, which closing force has a modulus that is approximately identical to that of the opening force, but in the opposite direction, and a means for suddenly reducing the pressure in the rear chamber, thus causing the sudden backward movement of the piston.

The efficiency of these air guns is, of course, particularly dependent on the volume of the enclosure and on the pressure of the air contained in it, but is equally dependent on the speed with which the enclosure is connected to the outlet conduit and on the head loss.

For example, there is a known valve (FR-A-2.660.395) whose piston is bowl-shaped, thus making it possible to reduce the weight, and therefore the inertia, of the piston, which makes it possible to substantially improve the backward speed of said piston.

The concavity of the bowl also makes it possible for it to house a plunger of small cross section forming the means for guiding the piston, thus making it possible to reduce the length of the piston as compared to a conventional piston.

In order to suddenly reduce the pressure in the rear chamber, the air in this chamber must be discharged rapidly.

In an attempt to achieve this, a known valve (FR-A-2.712.639) comprises:

disposed in a discharge conduit connecting the rear chamber to the outlet conduit, a shutoff element called the main shutoff, which is movable between a so-called closed position and a so-called discharge position, this shutoff being stressed:

toward its so-called discharge position by the prevailing pressure in the above-mentioned rear chamber, which exerts on the front surface of this shutoff a so-called discharge force, and toward its closed position by the pressure of a gas contained in a so-called control chamber, which exerts on the rear surface of the shutoff a so-called closing force which pushes the shutoff into its seat, and means for returning the piston and the main shutoff to their respective closed positions.

A source of gas under pressure is connected to this valve and feeds the control chamber, which feeds the rear chamber through a so-called feed duct of small cross section, and this rear chamber feeds the enclosure via a controlled leak.

Thus, during the filling of the enclosure, it is the feed pressure that keeps the piston and the shutoff pressed into their respective seats.

A distributor is placed between the source of gas under pressure and the valve.

In order to produce the movement of the piston, the supply of pressurized gas is cut off, then the control chamber is connected at least indirectly to the atmosphere via the above-mentioned distributor, so that the pressure is rapidly reduced, and the shutoff opens to allow the gas contained in the rear chamber to escape.

This pressure reduction in the rear chamber allows the piston to move back, so as to establish the connection between the enclosure and the outlet conduit.

This series of steps makes it possible, with a relatively low control pressure, to release a large volume of air.

The path through which the gas escapes is sinuous, and unfortunately causes a substantial head loss.

In the example (FR-A-2.660.395), the inlet conduit that connects the enclosure to the valve has a constant diameter that is slightly smaller than the length of the piston, which inlet conduit opens into the lateral wall of this piston.

This constancy of the diameter reduces the head loss in the fluid that flows from the enclosure to the outlet conduit.

There is also a known valve (U.S. Pat. No. 4,201,362) whose opening is controlled by the movement of two shutoff elements:

Thus, the valve comprises:

in a so-called control conduit connecting the control chamber at least indirectly to the atmosphere, a second shutoff called a control shutoff that is movable between a so-called closed position in which the gas contained in the control chamber cannot escape and a so-called discharge position in which the gas contained in the control chamber can escape, a drive means for rapidly moving the control shutoff into its discharge position, and a means for respectively returning the control shutoff to its closed position.

In this multistage control system, the backward speed of the piston could be further improved, thereby producing better efficiency.

To this end, the subject of the invention is a valve of the above-mentioned type, characterized in that:

the area defined by the cross section of the discharge conduit is at least constant, or even increasing from the rear chamber toward the outlet conduit, in order to limit head loss and the main shutoff has a low inertia.

BRIEF DESCRIPTION OF THE DRAWINGS

The features of the invention will be better understood with reference to the following figures in which like characters represent like parts throughout the several views and in which.

Figure 1:
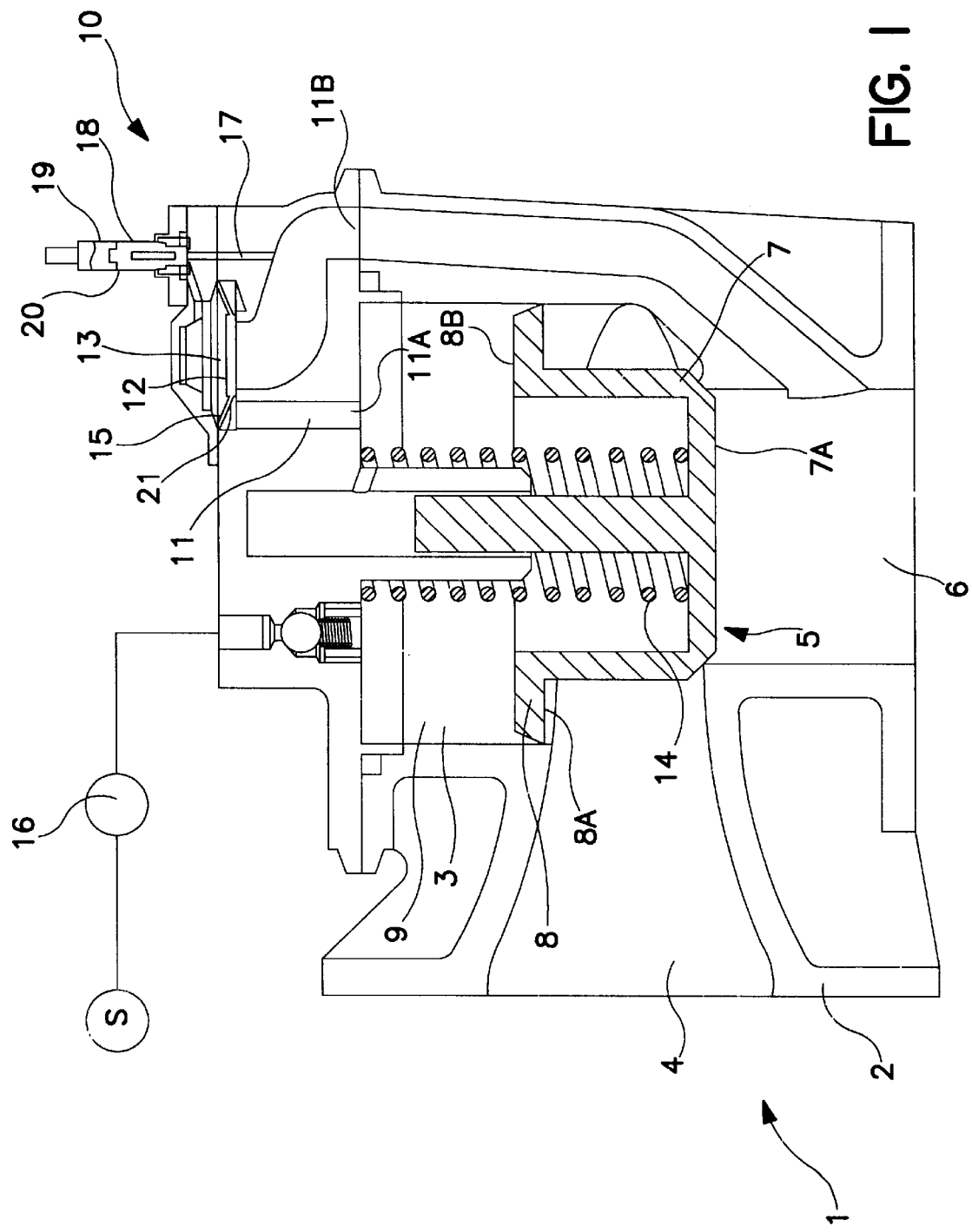
FIG. 1 is a vertical cross section of a monostable valve according to the invention.
Figure 2:
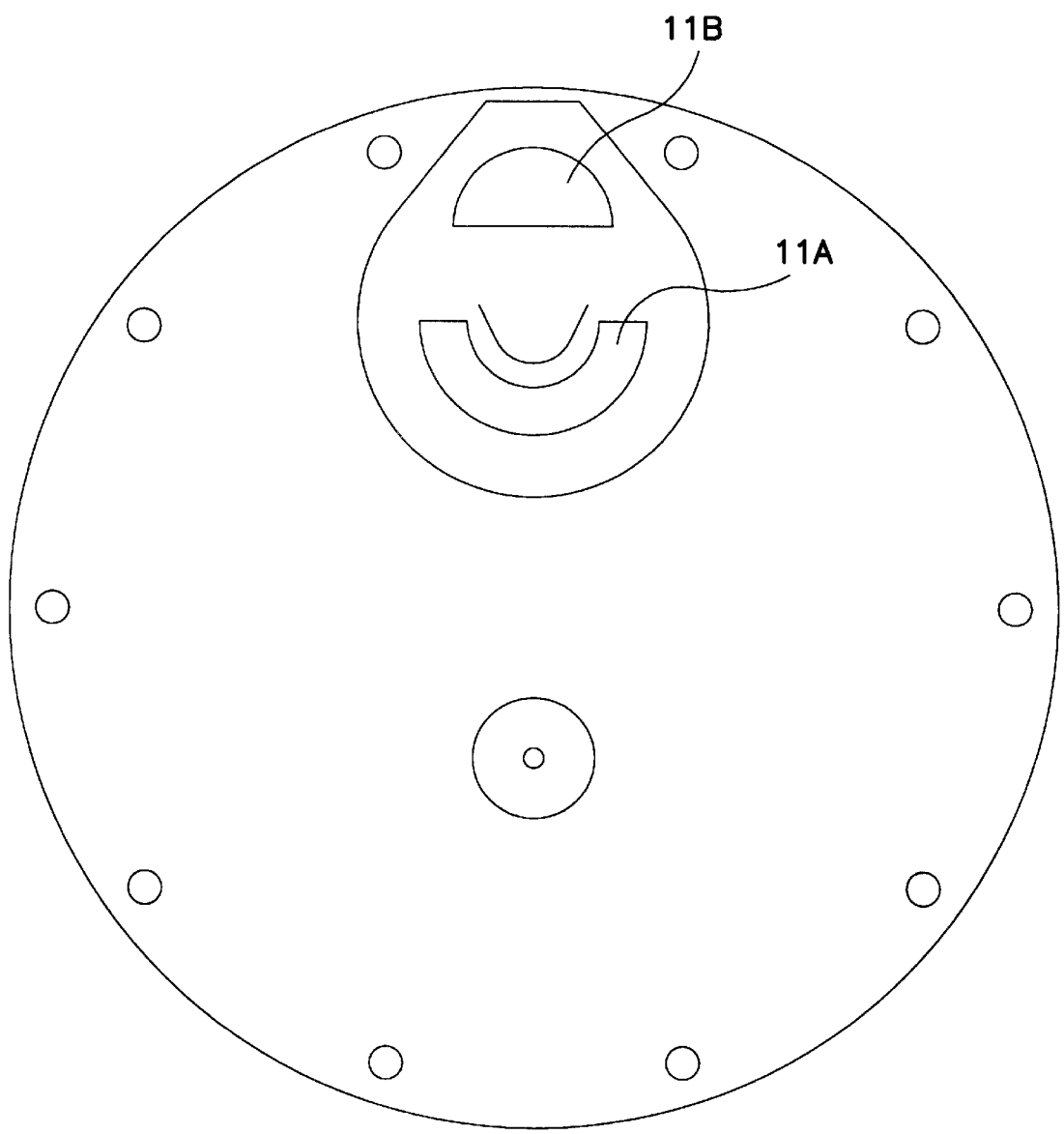
FIG. 2 is a horizontal cross section of the valve.
Figure 3:
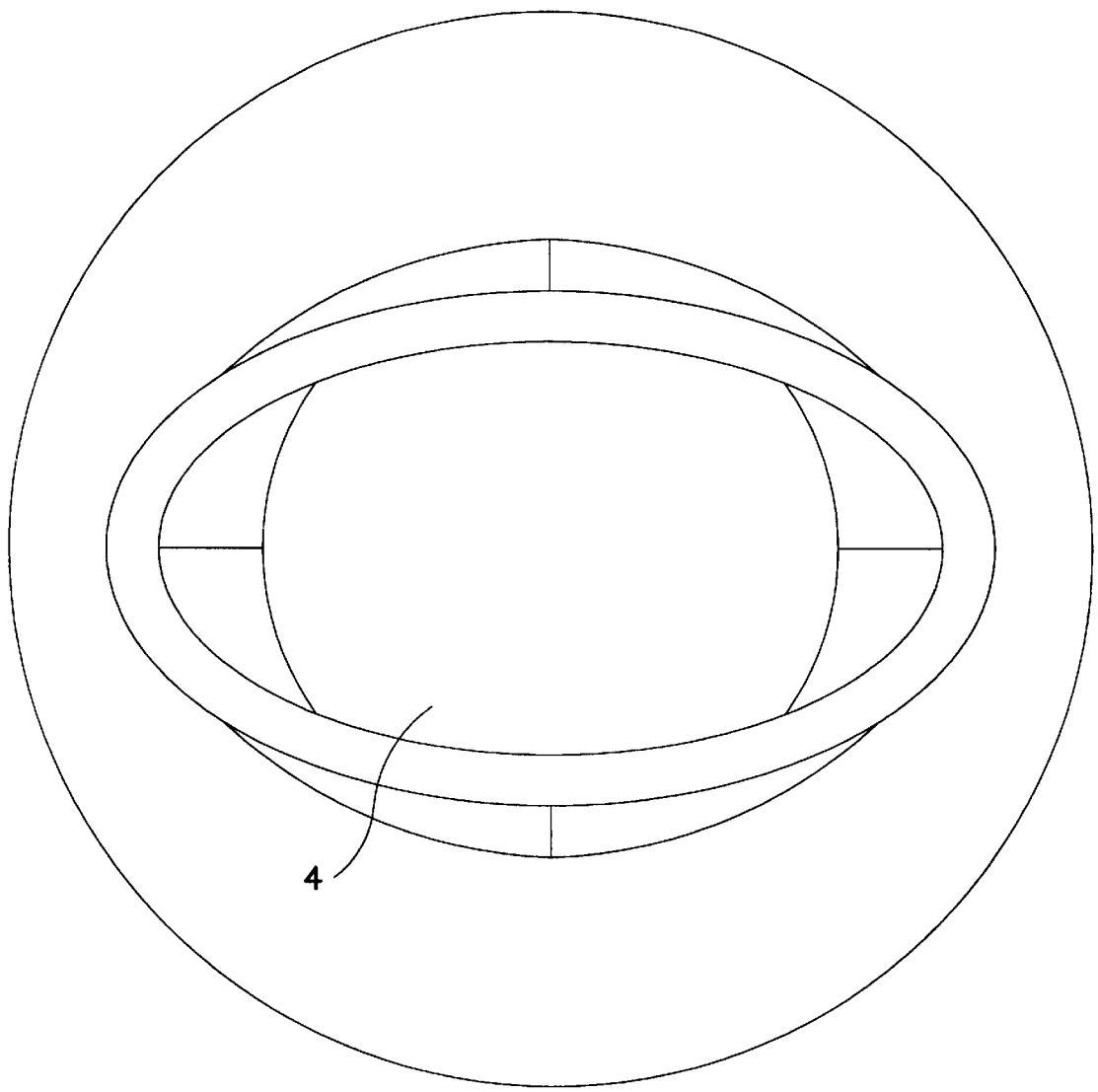
FIGS. 3 and 4 are two vertical cross sections with FIG. 4 being a cross section
Figure 4:
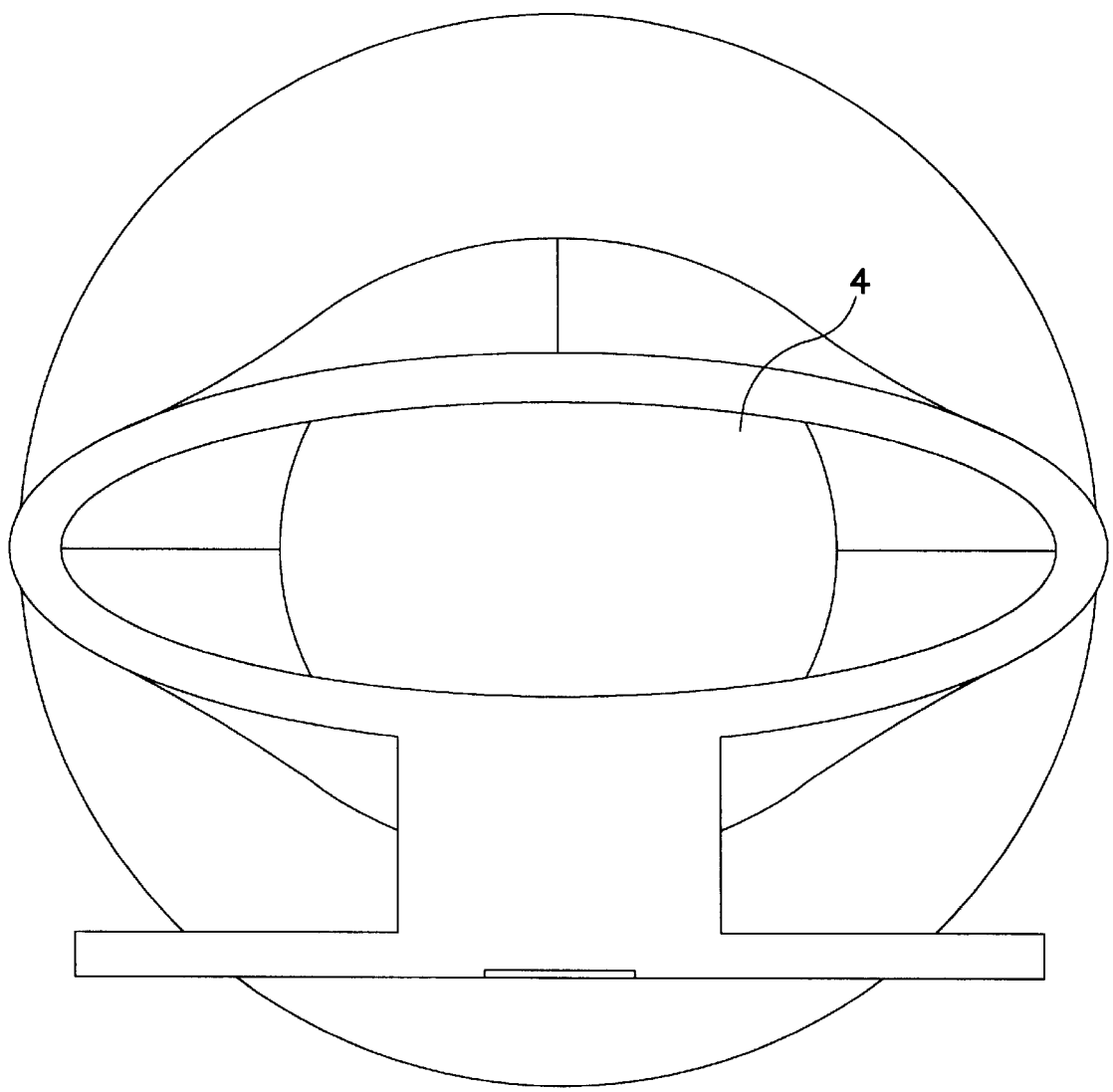

Referring to the drawing, it may be seen that the monostable valve 1, comprises:

- a body 2 delimiting a chamber 3 having an inlet conduit 4 connected to an enclosure, and a so-called discharge opening 5 to an outlet conduit 6,
- a piston 7 housed in the above-mentioned chamber 3 that moves between a so-called closed position in which the front surface 7A of this piston 7 closes the discharge opening and a so-called open position in which this front surface is separated from the discharge opening so that the air in the enclosure can be suddenly discharged through the outlet conduit, which piston:
  - has a flange 8 that divides the chamber 3 into a front chamber and a rear chamber 9, whose so-called "front surface" 8A facing the front of the piston and the discharge opening is subjected to the pressure of the air trapped in the enclosure, which pressure generates a so-called opening force that tends to push the piston back and bring it into the open position, and
  - delimits, between its rear surface 8B and the body of the valve, the rear chamber 9 in which a pressure is exerted that generates on the back of the piston a so-called closing force, pushing the piston into its closed position, which closing force has a modulus that is approximately identical to that of the opening force, but in the opposite direction, and
- a means 10 for suddenly reducing the pressure in the rear chamber, thus causing the sudden backward movement of the piston.

In order to suddenly reduce the pressure in the rear chamber, the valve typically also comprises:

- disposed in a discharge conduit 11 connecting the rear chamber 9 to the outlet conduit 6, a shutoff element 12 called the main shutoff, which is movable between a so-called closed position and a so-called discharge position, this shutoff being stressed:
  - toward its so-called discharge position by the prevailing pressure the above-mentioned rear chamber, which exerts on the front surface of this shutoff a so-called discharge force, and
  - toward its closed position by the pressure of a gas contained in a so-called control chamber 13, which exerts on the rear surface of the shutoff a so-called closing force which pushes the shutoff into its seat, and
- means 14, 15 for returning the piston and the main shutoff to their respective closed positions.

The feeding of the enclosure is done by introducing gas under pressure issuing from an external source S directly into the rear chamber 9 under the control of a distributor 16 that communicates with the enclosure via a controlled leak at the level of the sealing surface of the flange of the piston.

The valve comprises:

- in a so-called control conduit 17 connecting the control chamber at least indirectly to the atmosphere, a second, so-called control shutoff 18 that is movable between a so-called closed position in which the gas contained in the control chamber 13 cannot escape and a so-called discharge position in which the gas contained in the control chamber can escape,
- a drive means 19 for rapidly moving the control shutoff into its discharge position, and
- a means 20 for respectively returning the control shutoff to its closed position.

According to one characteristic of the invention:

- the area defined by the cross section of the discharge conduit 11 is at least constant, or even increasing from the rear chamber 9 toward the outlet conduit 6, so as to limit head loss and
- the main shutoff 12 has a low inertia.

The control chamber 13 has a low volume and connects to the rear chamber via an opening 21 of small cross section, so that the rear chamber and the control chamber are at the same pressure.

Advantageously, the section 11A of the discharge conduit upstream from the main shutoff, called the upstream section, has a crescent-shaped cross section disposed around the downstream section 11B of this discharge conduit, which itself has an approximately circular cross section, the cross sections of these two sections also having identical areas.

The main shutoff 12 is a diaphragm shutoff comprising, for example, a rigid center zone constituting the active part of the shutoff and a flexible peripheral zone for the positioning of the shutoff.

A metal diaphragm could be used.

It is at least this peripheral zone, in part, that is subjected to the pressure of the gas contained in the rear chamber.

The upstream section of the discharge conduit is disposed behind the rear chamber, and the downstream section runs along the side of the chamber that houses the piston.

The opening 21 that allows the introduction of the gas into the control chamber is disposed in the diaphragm.

The utilization of such a shutoff makes it possible to use a large opening area by using a mechanical part with a low weight, which promotes speed, and with a reduced stroke.

The control shutoff is constituted, for example, by a small piston that moves under the effect of a magnetic field produced by an electromagnet.

Advantageously, the discharge of the gas contained in the control chamber takes place in the downstream section 11B of the discharge conduit, so that the noise produced during the discharge of the gas is directed, for example, into the kiln and not to the outside, which would be disturbing to personnel.

Advantageously, the inlet conduit 4 connecting the enclosure to the body of the valve housing the piston has, along its entire length, a cross section with a constant area, but with a geometry that varies depending on its position along the longitudinal axis of the conduit, so that at the level of the connection between the conduit and the body of the valve, this cross section is approximately elliptical, with the small dimension of the ellipse oriented parallel to the axis of movement of the piston.

This makes it possible to shorten the piston to approximately the value of the small axis of the ellipse, and thus to reduce its stroke without inducing any head loss.

Another advantage of the embodiment results from the disposition of the components of the valve.

In fact, the introduction of the gas issuing from the source happens directly behind the piston 7, and not, as is usually done, through a controlled leak.

This improves the holding of the piston in its seat during the filling.

Another advantageous aspect is the fact that the part that carries the means for guiding the piston and that, together with the body of the valve, delimits the chamber, houses the flap that allows the introduction of the air, and carries on its rear surface the control shutoff.

This type of assembly makes it easy to replace the various elements without having to resort to numerous disassembly-reassembly operations.

What is claimed is:

1. Monostable valve for controlling the sudden discharge of a gas contained in an enclosure comprising:

a body (2) delimiting a chamber (3) having an inlet conduit (4) connected to an enclosure, and a discharge opening (5) to an outlet conduit (6), a piston (7) housed in the chamber (3) that moves between a closed position in which a front surface (7A) of the piston (7) closes the discharge opening and an open position in which the front surface is separated from the discharge opening so that air in the enclosure can be suddenly discharged through the outlet conduit, which piston:

has a flange (8) that divides the chamber (3) into a front chamber and a rear chamber (9), and has a front surface (8A) facing the front of the piston and the discharge opening is subjected to the pressure of the air trapped in the enclosure, which pressure generates an opening force that tends to push the piston back and bring it into the open position, and delimits, between its rear surface (8B) and the body of the valve, said rear chamber (9) in which, a pressure is exerted that generates on the back of the piston a closing force that pushes the piston into its closed position, which closing force has a modulus that is approximately identical to that of the opening force, but in the opposite direction, and in order to suddenly reduce the pressure in the rear chamber the valve also comprises:

disposed in a discharge conduit (11) connecting the rear chamber (9) to the outlet conduit (6), a main shutoff 12, which is movable between a closed position and a discharge position, the main shutoff being stressed:

toward its discharge position by the prevailing pressure in the rear chamber, which exerts on the front surface of the main shutoff a discharge force, and toward its closed position by the pressure of a gas contained in a control chamber (13), which exerts on a rear surface of a rear shutoff a closing force which pushes the main shutoff into a seat, and means (14, 15) for returning the piston and the main shutoff to their respective closed positions, the valve also comprising:

in a control conduit (17) connecting the control chamber at least indirectly to the atmosphere, a control shutoff (18) that is movable between a closed position in which the gas contained in the control chamber (13) cannot escape and a discharge position in which the gas contained in the control chamber can escape, a drive means (19) for rapidly moving the control shutoff into its discharge position, and a means (20) for respectively returning the control shutoff to its closed position, the valve being characterized in that:

the area defined by the cross section of the discharge conduit (11) is at least constant, or even increasing from the rear chamber (9) toward the outlet conduit (6) so as to limit head loss, and the main shutoff (12) has a low inertia.

2. Valve according to claim 1, characterized in that the section (11A) of the discharge conduit upstream from the main shutoff, called the upstream section, has a crescent-shaped cross section disposed around the downstream section (11B) of this discharge conduit, which itself has an approximately circular cross section, the cross sections of these two sections also having identical areas.

3. Valve according to claim 2, characterized in that the main shutoff (12) is a diaphragm comprising a rigid center zone constituting the active part of the shutoff and a flexible peripheral zone for the positioning of the shutoff.

4. Valve according to claim 3, characterized in that the opening (21) that allows the introduction of the gas into the control chamber is disposed in the diaphragm.

5. Valve according to claim 1, characterized in that the control shutoff is constituted by a small piston that moves under the effect of a magnetic field produced by an electromagnet.

6. Valve according to claim 1, characterized in that the discharge of the gas contained in the control chamber takes place in the downstream section (11B) of the discharge conduit.

7. Valve according to claim 1, characterized in that the inlet conduit (4) connecting the enclosure to the body of the valve housing the piston has, along its entire length, a cross section with a constant area but with a geometry that varies depending on its position along the longitudinal axis of the conduit, so that at the level of the connection between the conduit and the body of the valve, this cross section is approximately elliptical, with the small dimension of the ellipse oriented parallel to the axis of movement of the piston.

* * * * *